Figure 2:
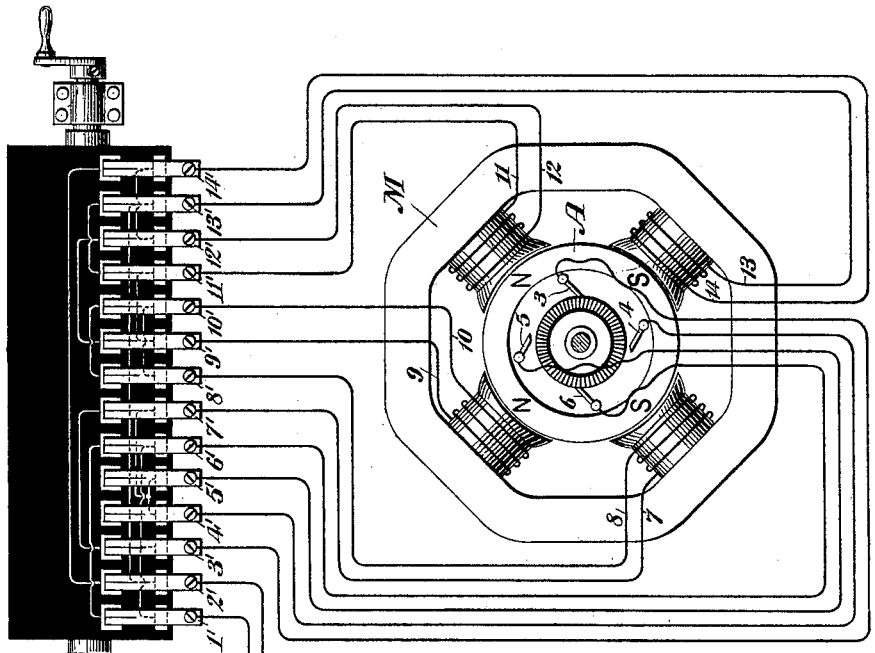

(No Model.)

R. S. DOBBIE.
DYNAMO ELECTRIC MACHINE.

No. 606,407. Patented June 28, 1898.

Witnesses
C. E. Ashley
C. J. Reed

Inventor
Robert S. Dobbie
By his Attorney
Charles J. Kintner

UNITED STATES PATENT OFFICE.

ROBERT S. DOBBIE, OF JERSEY CITY, NEW JERSEY.

DYNAMO-ELECTRIC MACHINE.

SPECIFICATION forming part of Letters Patent No. 606,407, dated June 28, 1898.

Application filed June 6, 1892. Serial No. 435,715. (No model.)

*To all whom it may concern:*

Be it known that I, ROBERT S. DOBBIE, a citizen of the United States, residing at Jersey City, in the county of Hudson and State of New Jersey, have made a new and useful Improvement in Dynamo-Electric Machines or Electric Motors, of which the following is a specification.

My invention relates especially to improvements in machines of the multipolar type; and its object is to so organize or assemble the terminals of the several field-magnet coils in such machines that the field-magnet poles may be made to produce different effects or assume different polarity and be grouped or arranged in various numbers of multiple pairs, so that the electromotive force or the speed of the armature may be varied at will.

To illustrate my meaning specifically, suppose we have a multipolar machine with an even number of field-magnet cores and that the same are wound in such manner that the consecutive poles thereof under ordinary conditions are alternately north and south, as is usual, and that it is desired to convert this machine into a multipolar machine with a less number of opposing poles—say 6, 4, or 2. I arrange the terminals of the several field-magnet coils of a multipolar dynamo-electric machine or electric motor so that they may be grouped together with relation to each other and to the terminals of the machine which run to the mains or leads and that its entire polar condition or effect may be relatively changed—that is to say, a twelve-pole machine may be converted into a six-pole, a four-pole, or a two-pole machine, an eight-pole machine may be converted into a four-pole or a two-pole machine, and a four-pole machine may be converted into a two-pole machine.

It is often desirable in the use of electric motors to suddenly change the speed of the armature's rotation in order to meet the demands made upon the motor or in the use of dynamo-electric machines to vary the electromotive force of the machine in order to meet the requirements of the external or working circuit. With existing forms of multipolar dynamo-machines or electric motors, so far as I am aware, it has heretofore been customary to effect these results by the use of extraneous means in the nature of regulators; but no one has, so far as I am aware, ever effected these results by varying the circuit connections of the multipolar field-magnet coils in such manner as to vary the effective number of field-magnet poles at will, and in the generic application of this principle is found the essence of my invention, and I accomplish the aforesaid results by varying the circuit relations between two or more pairs of field-magnet coils and two or more pairs of commutator-brushes by relatively so connecting said coils and commutator-brushes as to vary the current-supply, and hence its effect upon the rotary part of the machine, in proportion to the work that it (the machine) is called upon to perform.

My invention will be fully understood by referring to the accompanying drawings, in which—

Figure 1:
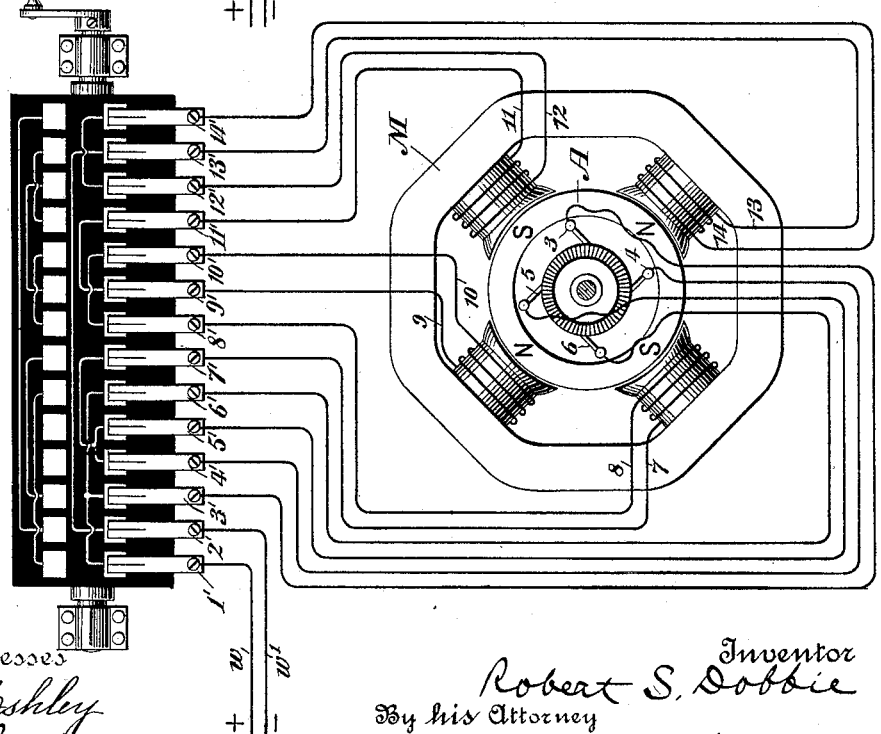

Figure 1 is a diagrammatic view of a four-pole dynamo-electric machine or electric motor with the circuits shown in diagram and an operating-switch for changing the relative circuit connections in accordance with my invention. Fig. 2 is a similar view illustrating the proposed change from the four-pole form shown in Fig. 1 to the two-pole form by my improved method of connecting up the terminals of the field-magnet coils, the switch being moved to its second position.

M represents a dynamo-electric machine or electric motor having multipolar field-magnet cores and an armature A, the latter carried by a shaft B and provided with a commutator C. There are shown four internally-projecting field-magnet cores, each of which is wound with an energizing-coil, the ends of which run to the lower ends of fixed switch-contact plates 7', 8', 9', 10', 11', 12', 13', and 14'. 1', 2', 3', 4', 5', and 6' are additional fixed contact-plates, the free ends of which, together with the like free ends of the contact-plates 7' to 14', inclusive, are adapted to rest upon either of two corresponding sets of conducting contact-plates carried by a switch-drum, said plates having intermediate circuit connections, as clearly shown in both figures of the drawings, for varying the circuit relations of the machine in accordance with my invention. The lower ends of the plates 1' and 2' are connected directly to the current mains or leads $w$ and $w'$, while the lower ends of the contact-plates 3', 4', 5', and 6' are connected by conductors directly with the commutator-brushes 3, 4, 5, and 6, resting upon the commutator of the machine. The upper ends of the contact-plates 1', 2', 3', 4', 5', and 6' are cross-connected with each other and with the upper end of contact-plate 13' by short conductors for the four-pole arrangement shown in Fig. 1, and the upper ends of the contact-plates 8', 9', 10', 11', 12', and 14' are connected, as shown in the same figure, while in Fig. 2 the upper end of the contact-plate 2' is connected to the upper end of the contact-plate 14' and the upper ends of the contact-plates 1', 6', 3', and 7' are connected with each other, as shown, and the upper ends of the contact-plates 8' and 10', 9' and 12', 11' and 13' are connected, as shown. Being a four-pole machine four commutator-brushes 3, 4, 5, and 6 are provided.

With the arrangement shown in Fig. 1, if the apparatus be in the nature of an electric motor M, the current enters from the lead $w$, passes thence from the contact-plate 1' to the contact-plates 3' 6', thence to the brushes 3 6, through the armature A, to the brushes 4 5, thence to the contact-plates 4', 5', and 7', field-magnet coil 7 8, producing a south pole; contact-plates 8' 10', field-magnet coil 10 9, producing a north pole; contact-plates 9' 11', field-magnet coil 11 12, producing a south pole; contact-plates 12' 14', field-magnet coil 14 13, producing a north pole; contact-plate 13', back to contact-plate 2', and out to line $w'$. This disposition of the current through the field-magnet coils and the armature through the four commutator-brushes, as described, creates four poles N S N S, alternating, as shown, and the machine is electrically connected, as is usual with the field-magnet coils, in series. Suppose now it is desired to give to the machine a bipolar effect, so that two north poles N N will appear on one side of the armature and two south poles S S on the other side. The switch-drum is rotated to its other position and the circuit connections are made through the several plates 1' to 14', inclusive, in the manner shown in Fig. 2, so that the current enters from the lead $w$, passes to contact-plate 1' and thence to contact-plate 6' and to the left-hand brush 6, thence through the armature to the right-hand brush 3, thence to the contact-plates 3' 7', field-magnet coil 7 8, producing a south pole; thence to the contact-plates 8' 10', thence to the field-magnet coil 10 9, producing a north pole; thence to the contact-plates 9' 12' and field-magnet coil 11 12, producing a north pole; thence to the contact-plates 11' 13' and field-magnet coil 13 14, producing a south pole; thence to the contact-plate 14', to contact-plate 2', to the outgoing lead $w'$, the field-coils being still in series relation and the current passing in such direction as to give to the upper pair north polarity N N and to the lower pair south polarity S S.

It will be observed that the contact-plates 4' 5' are on open circuit in Fig. 2 and that the commutator-brushes 4 and 5 are raised from the commutator, so that only one pair of brushes is in actual use, and that therefore the voltage and resistance are at a maximum. Inasmuch as the contact-plates 4' and 5' are disconnected and as the armature-wire connected to the bars under the brushes 4 and 5 do not cut lines of force they need not be raised from the commutator C, but are preferably so raised by usual means in order to diminish the wear thereof.

The arrangement of the circuit connections with the contact-plates 1' to 14', inclusive, may be effected either by binding-screws or by switch-plates, which may be manipulated by hand or otherwise in a manner appreciable to those skilled in switches or other means which effect commutation or changes in current direction through disconnected terminals for one or more electric circuits.

I do not limit myself to any specific means or apparatus for effecting a current commutation whereby a multipolar field-magnet dynamo-electric machine or electric motor is readily caused to produce different effects or assume different polar groupings, as my claims are directed, broadly, to the application of the generic principle of such conversion without relation to any special means for effecting it, and although I have shown a simple and efficient means for doing this the same result may be attained by means widely different in structure from that shown and still come within the terms of my claims; nor do I limit myself to the application or use of my invention in connection with dynamo-electric machines or electric motors of the specific type hereinbefore described, and illustrated in the accompanying drawings, as it is obvious that it may be applied to any well-known form of multipolar dynamo-electric machine known to those skilled in the art.

I am aware of British Patent to Pitt, No. 535, granted January 31, 1883, and United States Patent to Curtis and Crocker, No. 271,042, granted January 23, 1883, and I make no claim hereinafter broad enough to include the regulators described and shown in the aforesaid patents, in which current regulation is effected by varying the circuit relations of the field and armature circuits without the intervention of extraneous regulators, such as rheostats and the like. My invention differs therefrom in that both ends of the field-magnet conductors connected to each of the field-magnet coils are provided with fixed circuit-making and circuit-breaking contacts, and the armature-circuits are provided with similar fixed circuit-making and circuit-breaking contacts, all of which contacts are so related to each other and to additional movable interconnected switching-contacts that the current relations may be varied through the field-magnet coils and the armature-circuits at will; and my invention comprehends, broadly, the application of the principle of thus varying the circuit connections through the field-magnet coils of a dynamo-electric machine or electric motor from both ends of all of such coils and without relation to any special mechanism for effecting such changes, the essential feature being that the aforesaid changes through the field and armature coils shall always be in accordance with the work the machine is called upon to perform.

Having thus described my invention, what I claim, and desire to secure by Letters Patent of the United States, is—

1. The combination with a dynamo-electric machine having two or more pairs of pole-pieces, of a switch for rendering said machine bipolar or multipolar at will.

2. The combination with a multipolar dynamo-electric machine having pairs of pole-pieces of opposite polarity, of a series of contact-points to which the terminals of the field-magnet coils and commutator-brushes are connected, and means for varying the connections between said contact-points whereby said machine is rendered bipolar or multipolar at will.

3. A dynamo-electric machine or electric motor having two or more pairs of field-magnet coils and an armature provided with two or more pairs of commutator-brushes, in combination with circuit connections for changing the relative polarities of the field-magnet poles, substantially as described.

4. A multipolar dynamo-electric machine or electric motor provided with means for causing it to produce a bipolar or multipolar effect in accordance with the work it is called upon to perform.

5. A dynamo-electric machine or electric motor having two or more pairs of field-magnet coils and a single rotary part or armature provided with two or more pairs of commutator-brushes, in combination with an operating-switch carrying circuit connections for connecting the machine or motor to a pair of current-mains, and additional circuit connections for varying the circuit relations between the field-magnet coils and the commutator-brushes in accordance with the work which the machine is called upon to perform, the field-coils and outer ends of the commutator-brushes having circuit connection with each other only through the several movable circuit connections carried by the operating-switch, whereby said machine is rendered bipolar or multipolar at will.

6. A dynamo-electric machine or electric motor having two or more pairs of field-magnet coils, both ends of which coils are connected to stationary switching-contacts, two or more armature-circuits both ends of which armature-circuits are also connected to similar stationary switching-contacts, in combination with one or more series of movable switching-contacts provided with circuit connections for varying the circuit relations through the field-magnet and armature-circuits in accordance with the work which the machine is called upon to perform, and additional circuit connections connecting said movable switching-contacts with a current feeder or main, the field-magnet coils and armature-circuits having connection with each other only through the movable switching-contacts, whereby said machine is rendered bipolar or multipolar at will.

7. The combination with a multipolar dynamo-electric machine of a switch for varying the number of effective magnetic poles at will to vary the speed or voltage of the machine.

8. The combination with a multipolar dynamo-electric machine of the direct-current type, of a series of contact-points, to which the terminals of the field-magnet coils and commutator-brushes are connected, and means for varying the connections between said contact-points, whereby the number of poles of the machine is varied at will.

ROBERT S. DOBBIE.

Witnesses:
C. J. KINTNER,
M. M. ROBINSON.